US009563568B2

(12) United States Patent
Habermann et al.

(10) Patent No.: US 9,563,568 B2
(45) Date of Patent: *Feb. 7, 2017

(54) HIERARCHICAL CACHE STRUCTURE AND HANDLING THEREOF

(71) Applicant: INTERNATIONAL BUSINESS MACHINES CORPORATION, Armonk, NY (US)

(72) Inventors: Christian Habermann, Boeblingen (DE); Christian Jacobi, Poughkeepsie, NY (US); Martin Recktenwald, Schonaich (DE); Hans-Werner Tast, Weil im Schoenbuch (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,909

(22) Filed: Nov. 9, 2015

(65) Prior Publication Data

US 2016/0062905 A1    Mar. 3, 2016

Related U.S. Application Data

(63) Continuation of application No. 14/070,692, filed on Nov. 4, 2013, now Pat. No. 9,183,146.

(30) Foreign Application Priority Data

Nov. 8, 2012  (GB) .................................. 1220121.6

(51) Int. Cl.
*G06F 12/0811* (2016.01)
*G06F 12/08* (2016.01)
*G06F 13/00* (2006.01)

(52) U.S. Cl.
CPC ....... *G06F 12/0897* (2013.01); *G06F 12/0811* (2013.01); *G06F 2212/1024* (2013.01); *G06F 2212/604* (2013.01)

(58) Field of Classification Search
CPC ... G06F 12/0811; G06F 2212/00; G06F 13/00
(Continued)

(56) References Cited

U.S. PATENT DOCUMENTS 5,680,571 A  10/1997 Bauman
6,446,168 B1  9/2002 Normoyle et al.
(Continued)

OTHER PUBLICATIONS

Office Action for U.S. Appl. No. 14/070,639 dated Aug. 13, 2015, pp. 1-10.
(Continued)

*Primary Examiner* — Christopher Shin
(74) *Attorney, Agent, or Firm* — Margaret McNamara, Esq.; Blanche E. Schiller, Esq.; Heslin Rothenberg Farley & Mesiti P.C.

(57) ABSTRACT

A hierarchical cache structure includes at least one real indexed higher level cache with a directory and a unified cache array for data and instructions, and at least two lower level caches, each split in an instruction cache and a data cache. An instruction cache of a split real indexed second level cache includes a directory and a corresponding cache array connected to the real indexed third level cache. A data cache of the split second level cache includes a directory connected to the third level cache. An instruction cache of a split virtually indexed first level cache is connected to the second level instruction cache. A cache array of a data cache of the first level cache is connected to the cache array of the second level instruction cache and to the cache array of the third level cache. A directory of the first level data cache is connected to the second level instruction cache directory and to the third level cache directory.

20 Claims, 7 Drawing Sheets

(58) Field of Classification Search
USPC .................................................. 711/118–122
See application file for complete search history.

(56) References Cited

U.S. PATENT DOCUMENTS

| | | | |
|---|---|---|---|
| 7,251,710 B1 | 7/2007 | Isaac et al. | |
| 7,290,116 B1 | 10/2007 | Grohoski et al. | |
| 7,680,985 B2 | 3/2010 | Luick | |
| 7,769,955 B2 | 8/2010 | Özer et al. | |
| 7,890,699 B2 | 2/2011 | Comparan et al. | |
| 7,934,081 B2 | 4/2011 | Davis et al. | |
| 7,937,530 B2 | 5/2011 | Luick | |
| 8,015,362 B2 | 9/2011 | Alexander et al. | |
| 8,386,712 B2 | 2/2013 | Davis et al. | |
| 8,578,103 B2 | 11/2013 | Kobayashi | |
| 9,183,146 B2 * | 11/2015 | Habermann | G06F 12/0811 |
| 2002/0073280 A1 | 6/2002 | Ng | |
| 2002/0083312 A1 | 6/2002 | Sinharoy | |
| 2007/0156969 A1 | 7/2007 | Tian et al. | |
| 2008/0086596 A1 | 4/2008 | Davis et al. | |
| 2008/0086597 A1 | 4/2008 | Davis et al. | |
| 2008/0270758 A1 | 10/2008 | Ozer et al. | |
| 2009/0006753 A1 | 1/2009 | Luick | |
| 2009/0006754 A1 | 1/2009 | Luick | |
| 2009/0006803 A1 | 1/2009 | Luick | |
| 2009/0006812 A1 | 1/2009 | Luick | |
| 2009/0216949 A1 | 8/2009 | Krumm et al. | |
| 2010/0180084 A1 | 7/2010 | Cypher | |
| 2013/0047162 A1 | 2/2013 | Stefanov et al. | |
| 2014/0082298 A1 | 3/2014 | Jungwirth et al. | |
| 2014/0115258 A1 | 4/2014 | Week et al. | |
| 2014/0129773 A1 | 5/2014 | Habermann et al. | |
| 2014/0129774 A1 | 5/2014 | Habermann et al. | |
| 2015/0154216 A1 | 6/2015 | Maybee et al. | |

OTHER PUBLICATIONS

Office Action for U.S. Appl. No. 15/093,088 dated Jun. 3, 2016, pp. 1-9.
Final Office Action for U.S. Appl. No. 15/093,088 dated Dec. 12, 2016, pp. 1-8.

* cited by examiner

US 9,563,568 B2

HIERARCHICAL CACHE STRUCTURE AND HANDLING THEREOF

PRIOR FOREIGN APPLICATION

This application is a continuation of co-pending U.S. patent application Ser. No. 14/070,692, filed Nov. 4, 2013, entitled "HIERARCHICAL CACHE STRUCTURE AND HANDLING THEREOF," which claims priority from United Kingdom patent application number 1220121.6, filed Nov. 8, 2012, each of which is hereby incorporated herein by reference in its entirety.

BACKGROUND

One or more aspects of the present invention relate in general to the field of hierarchical cache structures, and in particular to handling hierarchical cache structures.

A cache memory, or cache, is a high speed memory positioned between a processor and main storage, to hold recently accessed main storage data. Whenever data in storage is accessed, it is first determined whether or not the data is in the cache and, if so, it is accessed from the cache. If the data is not in the cache, the data is obtained from the main storage and the data is also stored in the cache, usually replacing other data which had been stored in the cache memory. Usually a cache hierarchy is implemented, where multiple levels of cache exist between the processor and main storage. As one gets farther away from the processor, each cache gets larger, slower and cheaper per byte. The cache closest to the processor is called first level cache, the next-closest cache is called second level cache, and the next-closest cache is called third level cache, and so on.

One processor may have multiple first level caches, such as one first level cache for data and/or operands and one first level cache for instructions. That means that the first level cache is split in a first level data cache and in a first level instruction cache. A unified second level cache may be connected to multiple first level caches where the first level caches are either for the same processor or for multiple processors in a multi-processor system. Additionally the second level cache is the superset of the first level cache, i.e. all cache-line data of the first level cache is also in the second level cache.

Further the second level cache may also be split in a second level data cache and in a second level instruction cache, wherein the first level instruction cache is connected to the second level instruction cache and the first level data cache is connected to the second level data cache. A unified third level cache may be connected to multiple second level caches.

In a virtual memory system, a memory access issued by an instruction is usually a virtual address, or logical address, or effective address known to the associated program. The real address, or absolute address, or physical address in main memory associated with a virtual address can be determined through a translation process. The translation process is a multi-cycle multi-step process that involves table lookups to get the real address. To speed up the translation, a translation lookaside buffer is used. The translation lookaside buffer holds the virtual address and corresponding real address for recent translations. Depending on architectural requirements, the translation lookaside buffer uses more fields than just the virtual address and corresponding real address. The portion of an address that is subject to translation is known as a page. A cache has a directory array which holds the addresses of the data currently in the cache. Each address corresponds to a unit of storage called a cache-line.

In the Patent Application Publication US 2009/0216949 A1, which is hereby incorporated herein by reference in its entirety, a method and system for a multi-level virtual/real cache system with synonym resolution are disclosed. A disclosed embodiment includes a multi-level cache hierarchy, including a set of first level caches associated with one or more processor cores and a set of second level caches, wherein the set of first level caches are a subset of the set of second level caches, wherein the set of first level caches underneath a given second level cache are associated with one or more processor cores.

A virtually indexed first level cache and a real indexed second level cache allow faster access to the first level cache, without waiting for the translation lookaside buffer access. It requires that the second level cache sends the synonym to the first level cache for cross interrogations commands.

BRIEF SUMMARY

In an embodiment of the present invention, a computer program product for handling a hierarchical cache structure is provided. The computer program product includes a computer readable storage medium readable by a processing circuit and storing instructions for execution by the processing circuit for performing a method. The method includes initiating requests by a real indexed cache at one level of a hierarchical cache structure to a real indexed cache at another level of the hierarchical cache structure; initiating requests by a virtually indexed cache to the real indexed cache at the one level; and initiating other requests by said virtually indexed cache to the real indexed cache at the one level and to the real indexed cache at the another level.

BRIEF DESCRIPTION OF THE SEVERAL VIEWS OF THE DRAWINGS

Embodiments of the present invention, as described in detail below, are shown in the drawings, in which.

DETAILED DESCRIPTION

Figure 1:
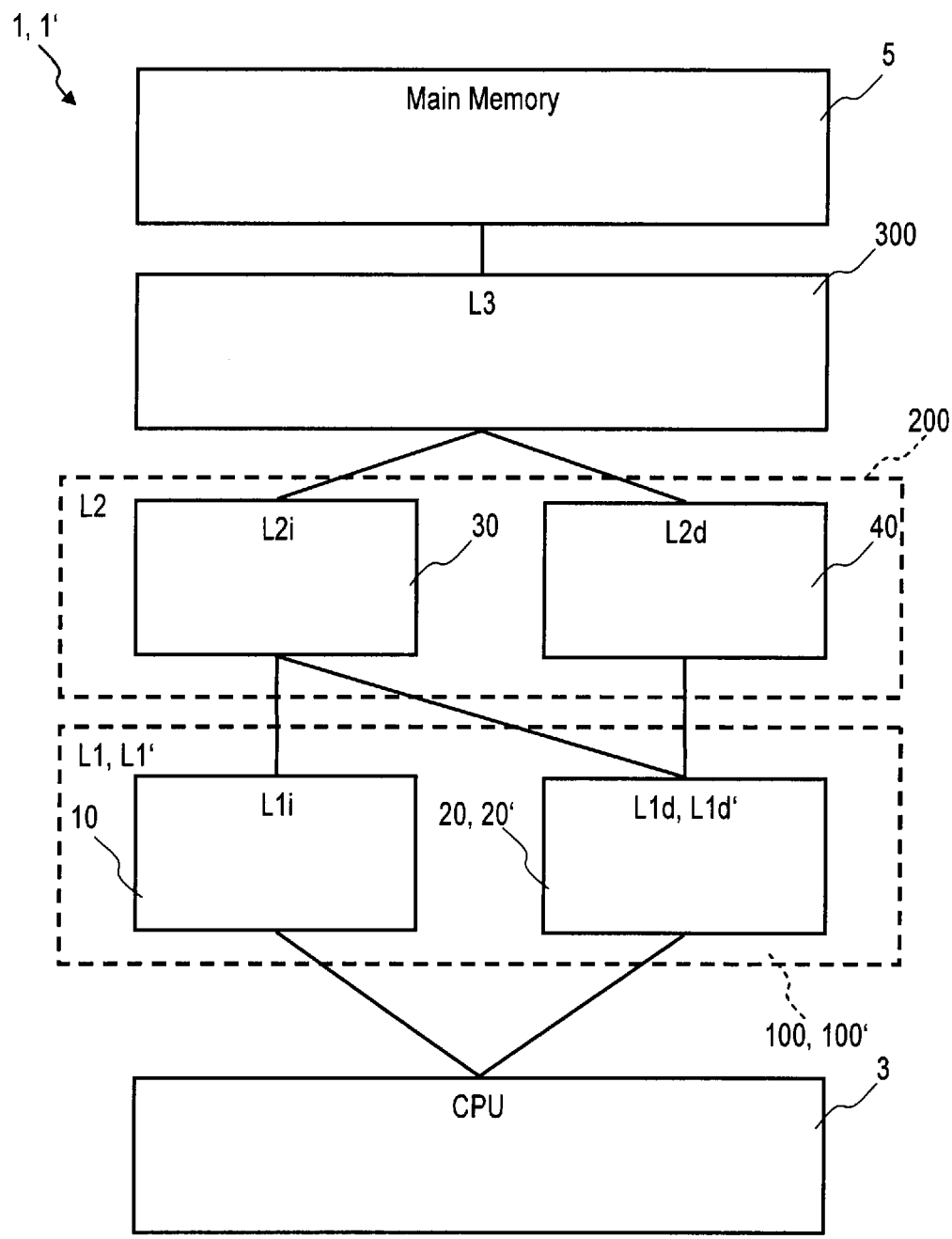
FIG. 1 is a schematic block diagram of a hierarchical cache structure, in accordance with an embodiment of the present invention.

One technical problem underlying one or more aspects of the present invention is to provide a hierarchical cache structure and a technique for handling a hierarchical cache structure, which are able to improve efficiency of multi-level cache hierarchy handling and to solve shortcomings and pain points of prior art hierarchical cache structures.

According to aspects of the present invention this problem is solved by providing a hierarchical cache structure, a method for handling a hierarchical cache structure, a data processing program for handling a hierarchical cache structure, and a computer program product for handling a hierarchical cache structure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
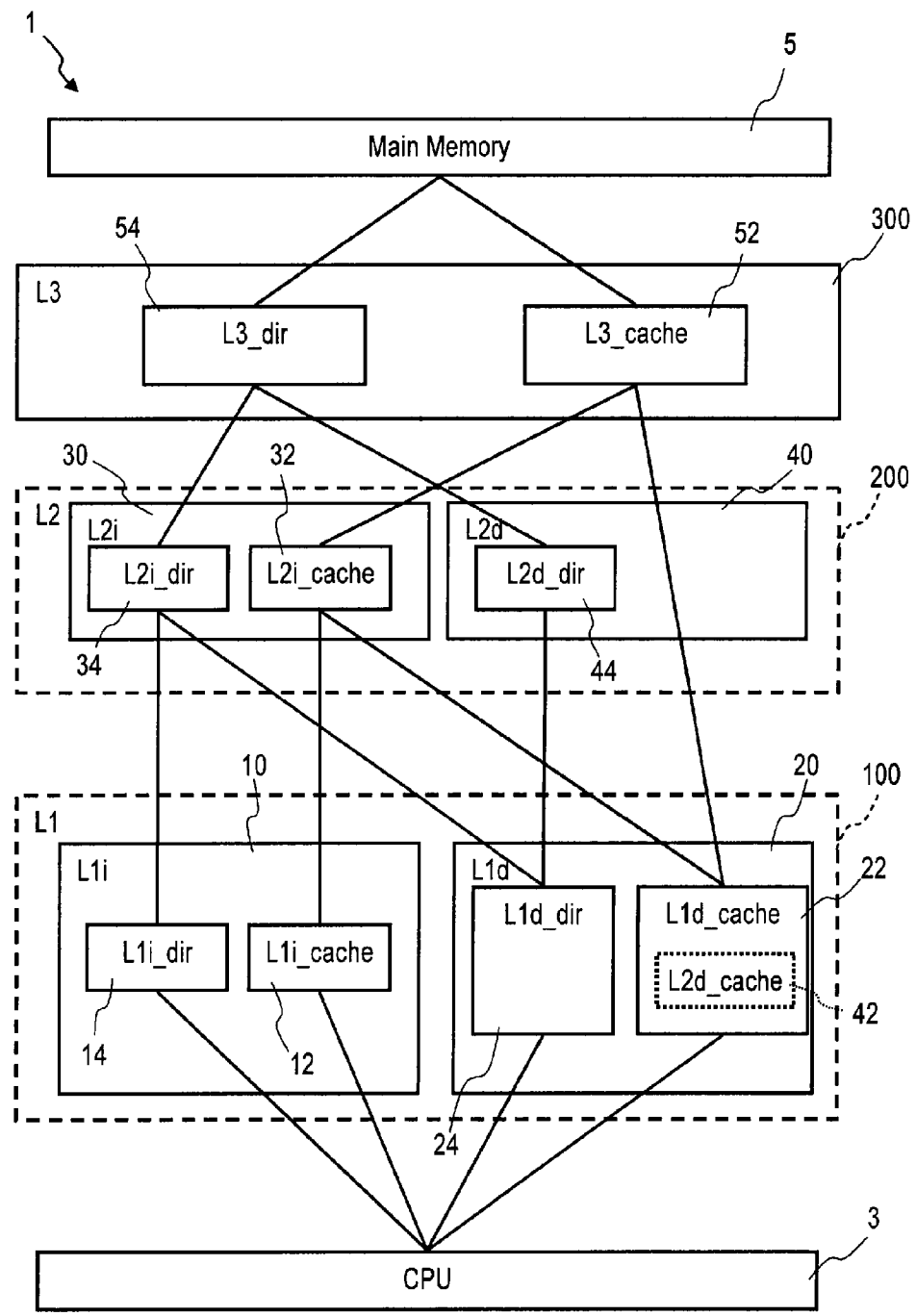
FIG. 2 is a more detailed block diagram of the hierarchical cache structure of FIG. 1, in accordance with a first embodiment of the present invention.
Figure 3:
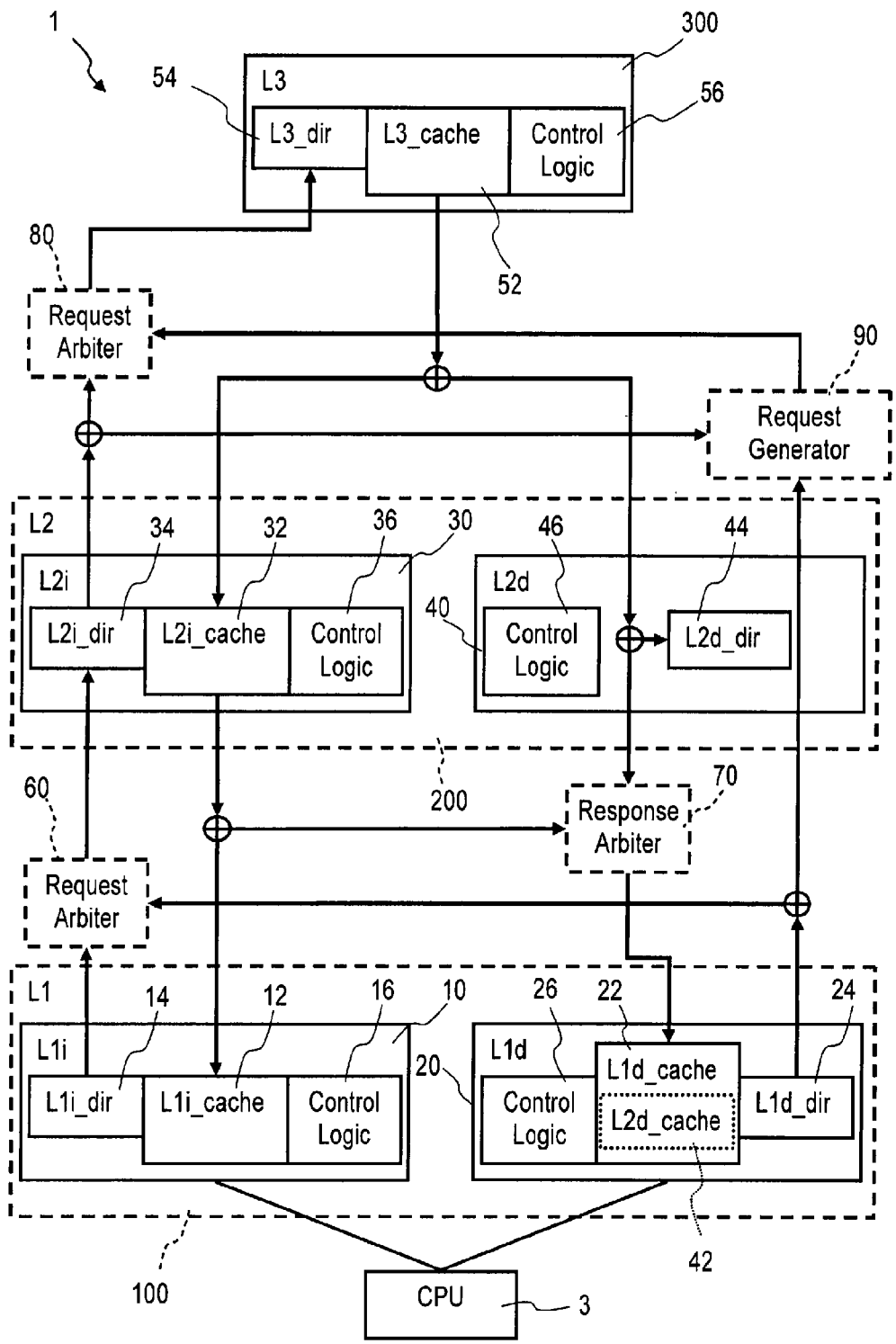
FIG. 3 is a more detailed block diagram of the hierarchical cache structure of FIGS. 1 and 2, in accordance with a first embodiment of the present invention.

FIGS. 1 to 3 show a hierarchical cache structure 1, in accordance with a first embodiment of the present invention.

Referring to FIGS. 1 to 3, the shown first embodiment of the present invention employs a hierarchical cache structure 1 arranged between a processor 3 and a main memory 5. In the shown first embodiment the hierarchical cache structure 1 comprises three levels, wherein a real indexed third level cache (L3) 300 comprises a directory (L3_dir) 54 and a unified cache array (L3_cache) 52 for data and instructions, and two lower level caches (L1) 100, (L2) 200 are each split in an instruction cache (L1$i$) 10, (L2$i$) 30 and a data cache (L1$d$) 20, (L2$d$) 40. An instruction cache (L2$i$) 30 of a split real indexed second level cache (L2) 200 comprises a directory (L2$i$_dir) 34 and a corresponding cache array (L2$i$_cache) 32 connected to the real indexed third level cache (L3) 300. A data cache (L2$d$) 40 of the split second level cache (L2) 200 comprises a directory (L2$d$_dir) 44 connected to the third level cache (L3) 300. An instruction cache (L1$i$) 10 of a split virtually indexed first level cache (L1) 100 is connected to the second level instruction cache (L2$i$) 30, and a cache array (L1$d$_cache) 22 of a data cache (L1$d$) 20 of the virtually indexed first level cache (L1) 100 is connected to the cache array (L2$i$_cache) 32 of the second level instruction cache (L2$i$) 30 and to the cache array (L3_cache) 52 of the real indexed third level cache (L3) 300 via a response arbiter 70. A directory (L1$d$_dir) 24 of the first level data cache (L1$d$) 20 is connected to the second level instruction cache directory (L2i_dir) 34 and to the third level cache directory (L3_dir) 34 via a request generator 90.

Referring to FIGS. 2 and 3, the real indexed third level cache (L3) 300 comprises a directory (L3_dir) 54 for the unified cache array (L3_cache) 52 and a control logic 56. Also the instruction caches (L1i) 10, (L2i) 30 of the different cache levels (L1) 100, (L2) 200 each comprise a directory (L1i_dir) 14, (L2i_dir) 34, a corresponding cache array (L1i_cache) 12, L2i_cache 32, and a control logic 16, 36. The data caches (L1d) 20, (L2d) 40 of the different cache levels (L1) 100, (L2) 200 each comprise a directory (L1d_dir) 24, (L2d_dir) 44, and a control logic 26, 46. The first level data cache (L1d) 20 comprises a corresponding cache array (L1d_cache) 22 and the second level data cache (L2d) 40 is a directory-only-cache without a cache array.

The shown cache array (L1d_cache) 22 of the virtual indexed first level data cache (L1d) 20 comprises a cache array (L2d_cache) 42 of the second level data cache (L2d) 40 and is so big, that the second level data cache (L2d) 40 is a directory-only-cache without a cache array. The first level data cache (L1d) 20 requests data directly from the third level cache (L3) 300, except if the data is already hit in the second level instruction cache (L2i) 30. However, the synonym for the first level data cache (L1d) 20 is recorded in the directory (L2d_dir) 44 of the second level data cache (L2d) 40 or in the directory (L2i_dir) 34 of the second level instruction cache (L2i) 30. The directory (L2d_dir) 44 of the second level data cache (L2d) 40 may be a content-addressable memory (CAM), with one entry per cache-line of the first level cache (L1d) 22 or it is to be big enough to avoid conflicts with the directory (L1d_dir) 24 of the first level data cache (L1d) 20. The shown implementation uses 512*8 entries for the directory (L1d_dir) 24 of the first level data cache (L1d) 20 and 512*10 entries for the directory (L2d_dir) 44 of the second level data cache (L2d) 40.

A first request arbiter 60 handles competition of requests directed to the same cache (L2i) 30 of the second cache level (L2) 200. A second request arbiter 80 handles competition of requests directed to the third cache level (L3) 300.

Figure 4:
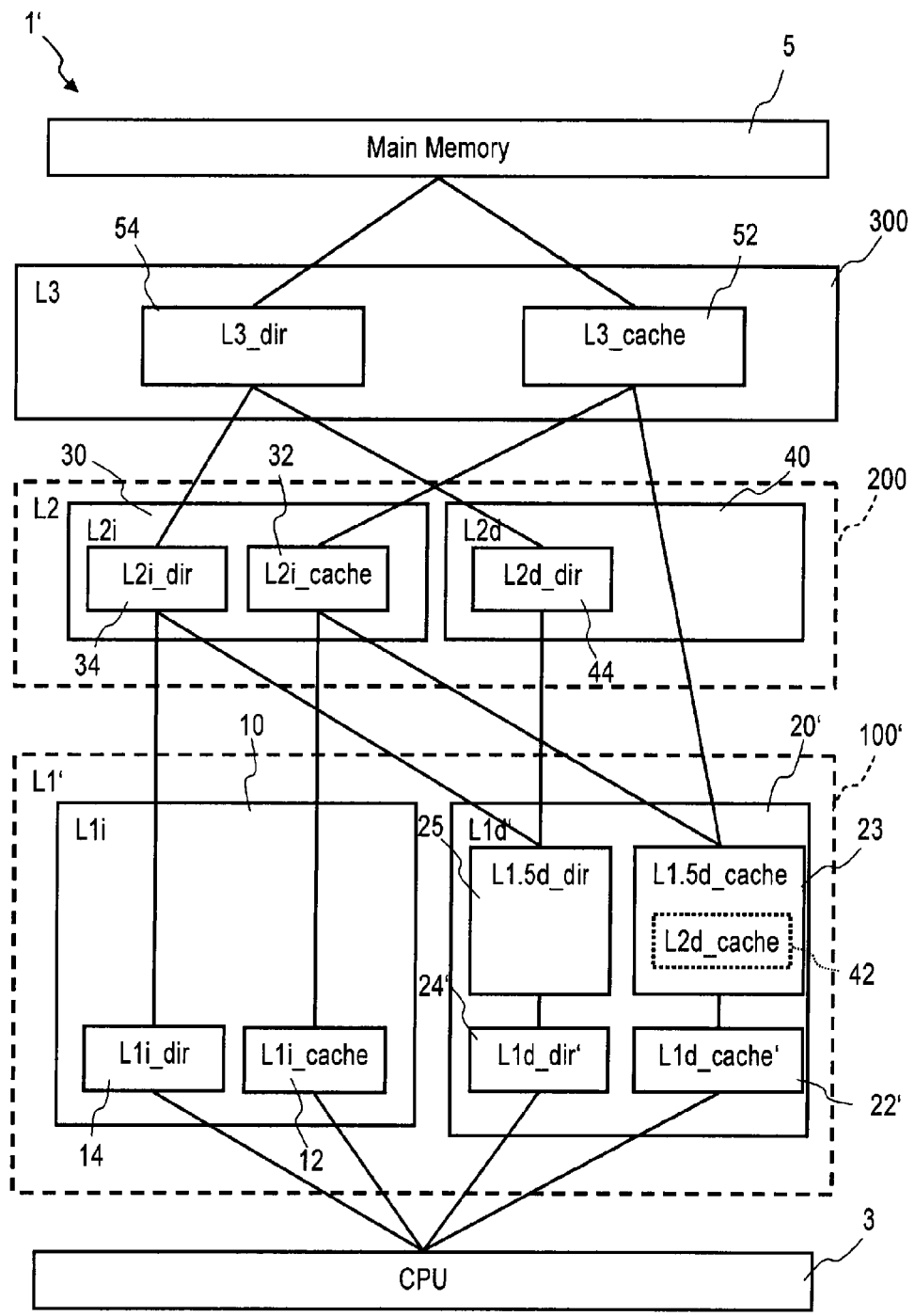
FIG. 4 is a more detailed block diagram of the hierarchical cache structure of FIG. 1, in accordance with a second embodiment of the present invention.

FIGS. 1 and 4 show a hierarchical cache structure 1', in accordance with a second embodiment of the present invention.

Referring to FIGS. 1 and 4, the shown second embodiment of the present invention employs, concurrently to the first embodiment, a hierarchical cache structure 1' arranged between a processor 3 and a main memory 5. In the shown second embodiment the hierarchical cache structure 1' comprises three levels, wherein a real indexed third level cache (L3) 300 comprises a directory (L3_dir) 54 and a unified cache array (L3_cache) 52 for data and instructions, and two lower level caches (L1') 100', (L2) 200 are each split in an instruction cache (L1i) 10, (L2i) 30 and a data cache (L1d') 20', (L2d) 40. An instruction cache (L2i) 30 of a split real indexed second level cache (L2) 200 comprises a directory (L2i_dir) 34 and a corresponding cache array (L2i_cache) 32 connected to the real indexed third level cache (L3) 300. A data cache (L2d) 40 of the split second level cache (L2) 200 comprises a directory (L2d_dir) 44 connected to the third level cache (L3) 300. An instruction cache (L1i) 10 of a split virtually indexed first level cache (L1') 100' is connected to the second level instruction cache (L2i) 30.

In contrast to the first embodiment, the big first level data cache (L1d') 20' is implemented as a two level structure comprising a first cache array (L1d_cache') 22' with a first directory (L1d_dir') 24', and a second cache array (L1.5d_cache) 23 with a second directory (L1.5d_dir) 25. Both levels of the first level data cache (L1d') 20' are virtually indexed. The second cache array (L1.5d_cache) 23 of the first level data cache (L1d') 20' really is a cache array (L2d) 42 of a second level data cache (L2d) 40 with virtual indexing. The second cache array (L1.5d_cache) 23 is connected to the cache array (L3_cache) 52 of the third level cache (L3) 300 and to the second level instruction cache (L2i) 30 via a response arbiter (not shown). So the second cache array (L1.5d_cache) of the first level data cache (L1d') 20' may receive data from the second level instruction cache (L2i) 30 or from the third level cache (L3) 300. A second directory (L1.5d_dir) 25 of the first level data cache (L1d') 20' is connected to the second level instruction cache directory (L2i_dir) 34 and to the third level cache directory (L3_dir) 34 via a request generator (not shown).

The second embodiment of the present invention allows fast access to the second cache array (L1.5d) 23 of the first level data cache (L1d') 20' in case of a miss in the first cache array (L1d_cache') 22' of the first level data cache (L1d') 20'. It does not have to wait for the translation lookaside buffer read before the second cache array (L1.5d_cache) 23 of the first level data cache (L1d') 20' can be accessed. Therefore the access to the second cache array (L1.5d_cache) 23 of the first level data cache (L1d') 20' is faster which results in a better performance in case of a miss in the first cache array (L1d_cache') 22' of the first level data cache (L1d') 20' and a hit in the second cache array (L1.5d_cache) 23 of the first level data cache (L1d') 20'. The extra directory (L2d_dir) 44 of the second level data cache (L2d) 40 is used for the synonyms (backward translation of real addresses for cross interrogate commands) to the virtual index of the second cache array (L1.5d_cache) 23 of the first level data cache (L1d') 20'.

Figure 5:
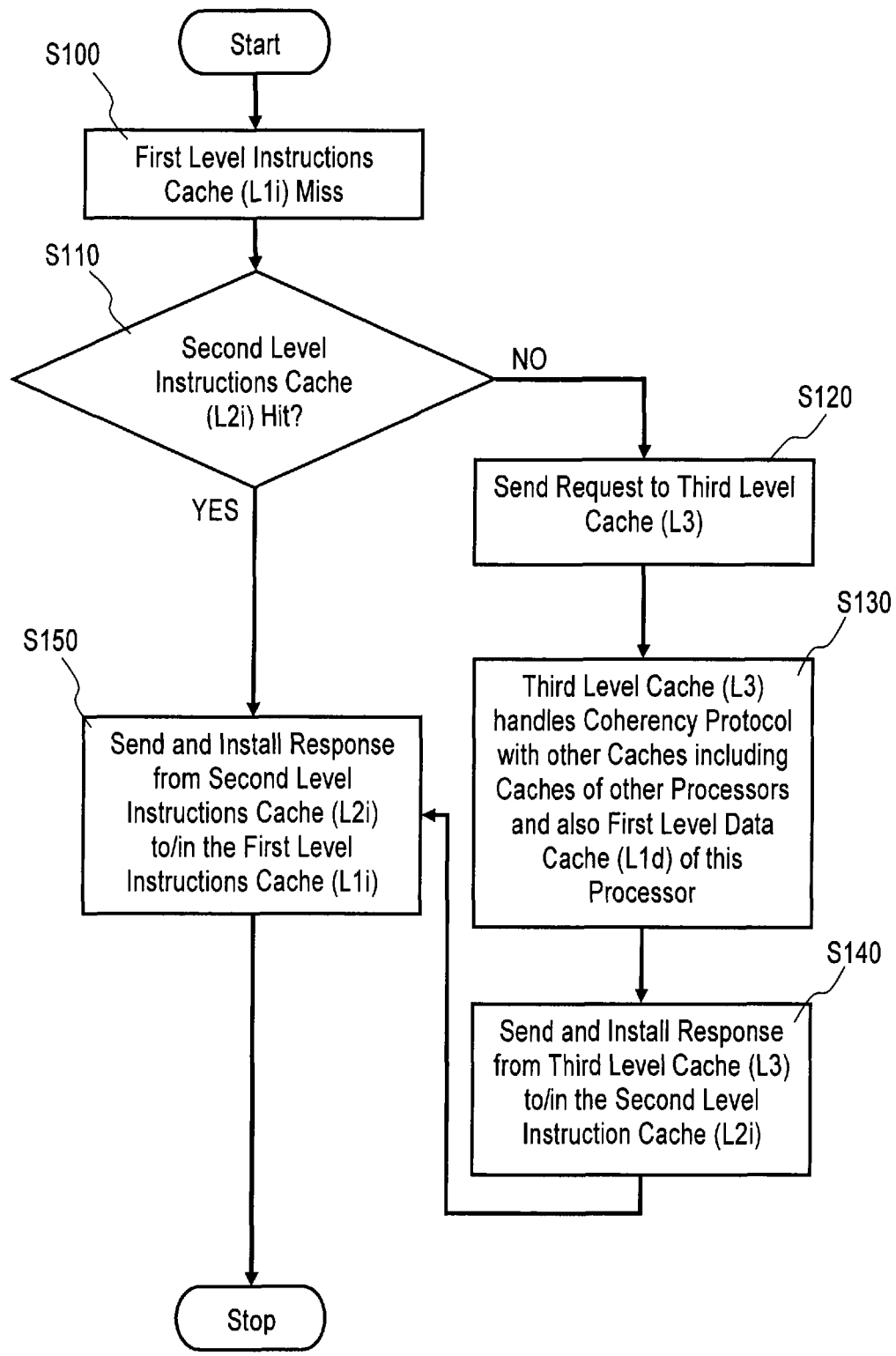
FIG. 5 is a schematic flow diagram of a method for cache handling, in case of a first level instruction cache miss, in accordance with an embodiment of the present invention.
Figure 6:
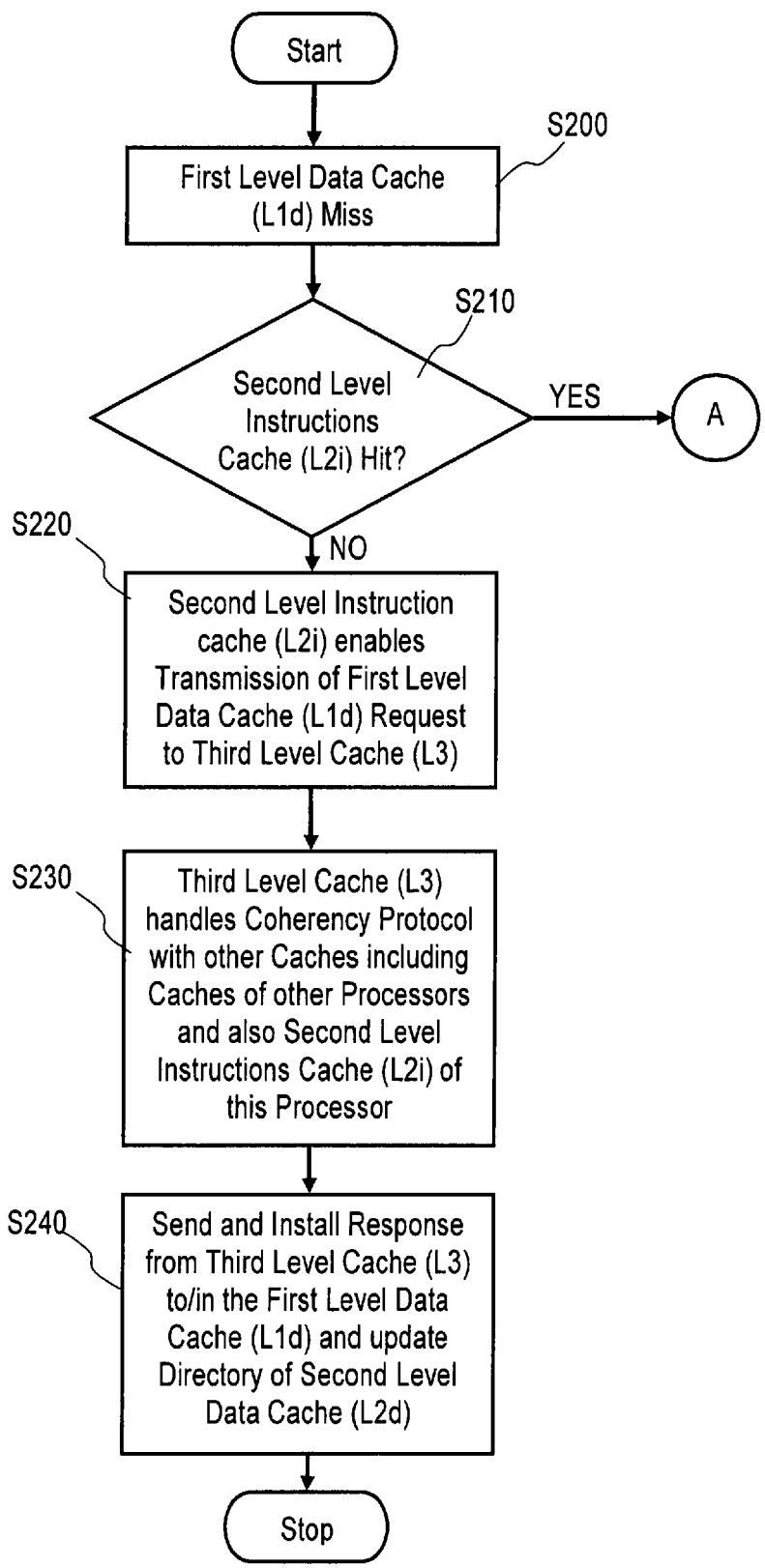
FIGS. 6 and 7 are schematic flow diagrams of a method for cache handling, in case of a first level data cache miss, in accordance with an embodiment of the present invention.
Figure 7:
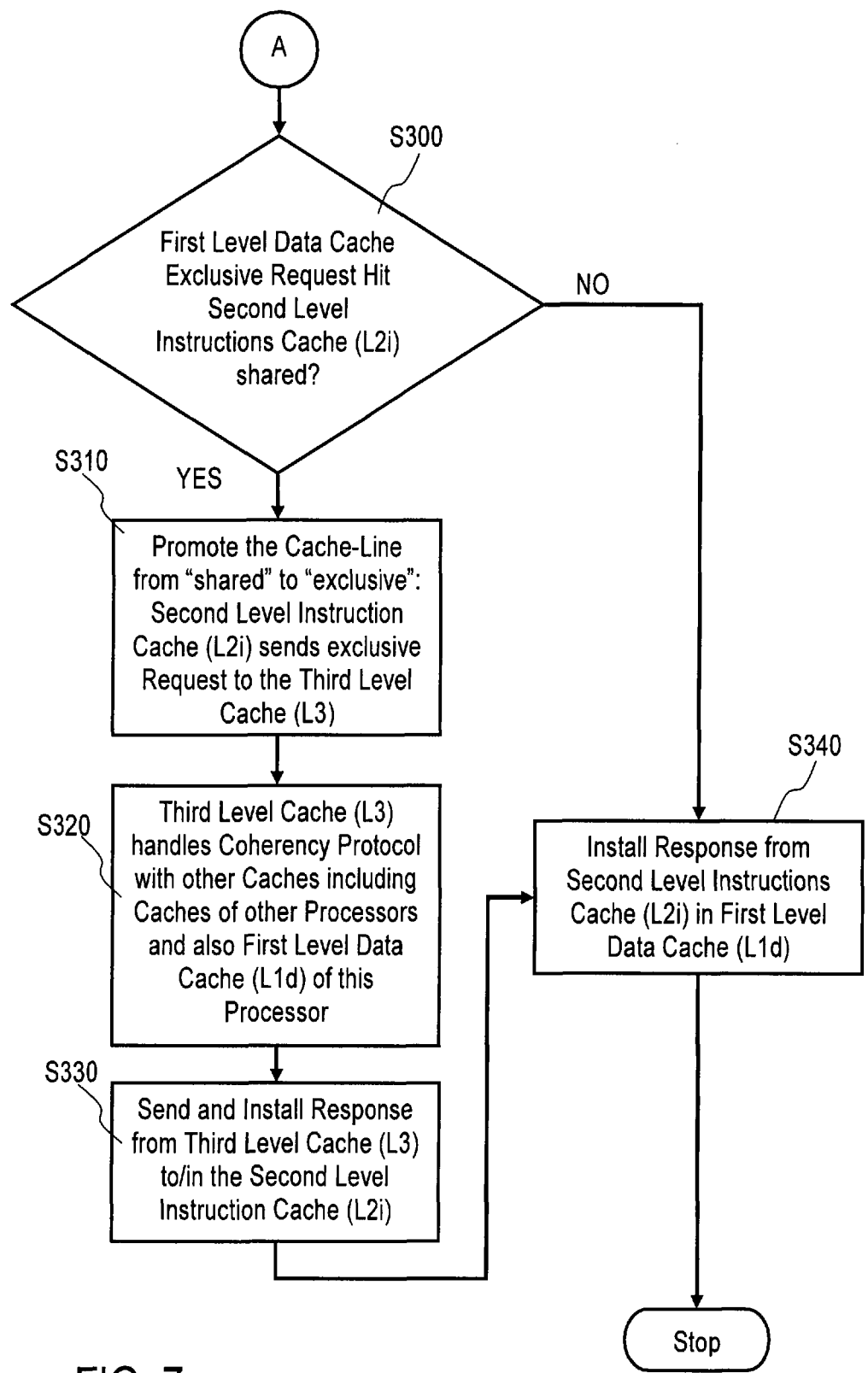

FIG. 5 shows steps of a method for virtually indexed cache handling in case of a first level instruction cache (L1i) miss, in accordance with an embodiment of the present invention; FIGS. 6 and 7 show steps of the method for virtually indexed cache handling in case of a first level data cache (L1d, L1d') miss, in accordance with an embodiment of the present invention.

Referring to FIGS. 1 to 5, according to a method for handling a hierarchical cache structure 1, 1' comprising at least one real indexed higher level cache (L3) 300 with a directory (L3_dir) 54 and a unified cache array (L3_cache) 52 for data and instructions and at least two lower level caches (L1) 100, (L2) 200, each split in an instruction cache (L1i) 10, (L2i) 30 and a data cache (L1d) 20, (L1d') 20', (L2d) 40, an instruction cache (L2i) 30 of a split real indexed second level cache (L2) 200 initiates requests to a real indexed third level cache (L3) 300. An instruction cache (L1i) 10 of a split virtually indexed first level cache (L1) 100 initiates requests to the instruction cache (L2i) 30 of the split second level cache (L2) 200, and a data cache (L1d) 20, (L1d') 20' of the split virtually indexed first level cache (L1) 100, L1' 100' initiates requests to the second level instruction cache (L2i) 30 and to the third level cache (L3) 300 via the request generator 90.

Generally a search for a requested address is sent to a directory (L1i_dir) 14, (L1d_dir) 24, (L1d_dir') 24', (L2i_dir) 34, (L3_dir) 54 of corresponding cache level (L1) 100, (L1') 100', (L2) 200, (L3) 300, 5. In case of a miss a directory (L1i_dir) 14, (L1d_dir) 24, (L1.5d_dir) 25, (L2i_dir) 34, (L3_dir) 54 of a corresponding cache level (L1) 100, (L1') 100', (L2) 200, (L3) 300 sends the request to a directory (L2i_dir) 34, (L1.5d_dir) 25, (L3_dir) 54 of a higher cache level (L2) 200, (L3) 300 until the request is sent to a main memory 5. In case of a hit a cache array (L2i_cache) 32, (L3_cache) 52 of a corresponding cache level (L2) 200, (L3) 300, 5 sends a response to the request to a cache array (L1*i*_cache) 14, (L1*d*_cache) 22, (L1.5*d*_cache) 23, (L2*i*_cache) 32, (L3_cache) 52 of a lower cache level (L1) 100, (L1') 100', (L2) 200, (L3) 300 until the response is sent to a processor 3. The response installs cache-line data of the cache array (L2*i*_cache) 32, (L3_cache) 52 of the higher cache level (L2) 200, (L3) 300, 5 in a corresponding cache array (L1*i*_cache) 14, (L1*d*_cache) 24, (L1.5*d*_cache) 23, (L2*i*_cache) 32, (L3_cache) 52 of the lower cache level (L1) 100, (L1') 100', (L2) 200, (L3) 300 and updates a corresponding directory (L1*i*_dir) 14, (L1*d*_dir) 24, (L1.5*d*_dir) 25, (L2*i*_dir) 34, (L2*d*_dir) 44, (L3_dir) 54 of the lower cache level (L1) 100, (L1') 100', (L2) 200, (L3) 300 accordingly. The directory (L2*d*_dir) 44 of the second level data cache (L2*d*) 40 is updated for reverse translation purposes only.

To avoid needless repetitions, embodiments of the method for virtually indexed cache handling are explained in detail in conjunction with the first embodiment of the virtually indexed hierarchical cache structure only.

Referring to FIGS. 3 and 5, the processor 3 requests instructions from the first level instruction cache (L1*i*) 12. Therefore the processor 3 sends a corresponding search for the request address to the directory (L1*i*_dir) 14 of the first level instruction cache (L1*i*) 10. The directory (L1*i*_dir) 14 detects a miss in step S100 and sends the request to the directory (L2*i*_dir) 34 of the second level instruction cache (L2*i*) 30. The request consists of a command and a command validation and an address of the cache-line. The command is to distinguish between pre-fetch and demand fetch. In the shown embodiment the size of a cache-line is 256 bytes. The request has to compete with requests from the directory (L1*d*_dir) 24, of the first level data cache (L1*d*) 20. The first request arbiter 60 handles the competition of the requests to the second level instruction cache (L2*i*) 30. The request arbiter 60 makes sure none of the two requestors, i.e. directory (L1*i*_dir) 14 and directory (L1*d*_dir) 24 starves.

The directory (L2*i*_dir) 34 of the second level instruction cache (L2*i*) 30 performs a search. In case of a hit, step S110 goes to step S150. In case of a miss, step S110 goes to step S120. In step S120, the directory (L2*i*_dir) 34 of the second level instruction cache (L2*i*) 30 forwards the request to the directory (L3_dir) 54 of the third level cache (L3) 300 via the second request arbiter 80 of the third level cache (L3) 300. In step S130, the second request arbiter 80 of the third level cache (L3) 300 handles a coherency protocol and the competition of the request with other requests to the third level cache (L3) 300, for example, from other processors or from the first level data cache (L1*d*) 20 of this processor 3. If the directory (L3_dir) 54 of the third level cache (L3) 300 also has a cache miss, it requests the cache-line from the next level of the cache hierarchy before it sends a response. If it has a hit, it can respond immediately. In step S140, the third level cache (L3) 300 sends the response to the cache array (L2*i*_cache) 32 of the second level instruction cache (L2*i*) 30 with the cache-line data from the cache array (L3_cache) 52 of the third level cache (L3) 300. The response installs the cache-line in the cache array (L2*i*_cache) 32 of the second level instruction cache (L2*i*) 30 and updates also the directory (L2*i*_dir) 34 of the second level instruction cache (L2*i*) 30 accordingly. In step S150, the second level instruction cache (L2*i*) 30 sends a response to the request to the first level instruction cache (L1*i*) 12 with the cache-line data from the cache array (L2*i*_cache) 32 of the second level instruction cache (L2*i*) 30. The response installs the cache-line in the cache array (L1*i*_cache) 12 of the first level instruction cache (L1*i*) 10 and updates also the directory (L1*i*_dir) 14 of the first level instruction cache (L1*i*) 10 accordingly.

Referring to FIGS. 3, 6 and 7, the processor 3 requests data from the first level data cache (L1*d*) 20. Therefore the processor 3 sends a search for the request address to the directory (L1*d*_dir) 24 of the first level data cache (L1*d*) 20. The directory (L1*d*_dir) 24 detects a miss in step S200 and sends the request to the request generator 90 and also to the directory (L2*i*_dir) 34 of the second level instruction cache (L2*i*) 30 via the first request arbiter 60 of the second level instruction cache (L2*i*) 30. The request consists of a command and command validation and the address of the cache-line. The command is used to distinguish between pre-fetch and demand fetch, and also to distinguish between exclusive ownership and shared ownership. In the present embodiment the size of the cache-line is 256 bytes. The cache protocol is used to prevent that the cache-line valid in the directory (L1*d*_dir) 24 of the first level data cache (L1*d*) 20 is valid in both, the directory (L2*d*_dir) 44 of the second level data cache (L2*d*) 40 and in the directory (L2*i*_dir) 34 of the second level instruction cache (L2*i*) 30 at the same time. If the cache-line is in the second level instruction cache (L2*i*) 30, both, the first level instruction cache (L1*i*) 10 and the first level data cache (L1*d*) 20 will fetch it from there. If the cache-line is in the directory (L2*d*_dir) 44 of the second level data cache (L2*d*) 40 and it is requested by the first level instruction cache (L1*i*) 10, the cache-line is invalidated in the directory (L2*d*_dir) 44 of the second level data cache (L2*d*) 40 and also in the first level data cache (L1*d*) 20 and installed in the second level instruction cache (L2*i*) 30. From there the first level data cache (L1*d*) 20 may re-fetch it, if necessary.

In case of a hit in the directory (L2*i*_dir) 34 of the second level instruction cache (L2*i*) 30 step S210 goes to step S300 of FIG. 7. In case of a miss in the directory (L2*i*_dir) 34 of the second level instruction cache (L2*i*) 30 step S210 goes to step S220. In step S220 the miss in the directory (L2*i*_dir) 34 is used to generate a signal to enable the request generator 90 of the second level data cache (L2*d*) 40 to forward the request of the first level data cache (L1*d*) 20, 20' to the third level cache (L3) 300 via the second request arbiter 80. So, the miss in the second level instruction cache (L2*i*) 30 or in the first level data cache (L1*d*) 20 is not forwarded directly to the second request arbiter 80 of the third level cache (L3) 300. In step S230, the second request arbiter 80 of the third level cache (L3) 300 handles a coherency protocol and the competition of the request with other requests to the third level cache (L3) 300, for example, from other processors or from the second level instruction cache (L2*i*) 30 of this processor 3. If the directory (L3_dir) 54 of the third level cache (L3) 300 also has a cache-line miss, it requests the cache-line from the next level of the cache hierarchy 1 before it sends a response. If it has a hit, it can respond immediately. In step S240 the cache array (L3_cache) 52 of the third level cache (L3) 300 sends the response via response arbiter 70 of the second level cache (L2) 200 to the cache array (L1*d*_cache) 22 of the first level data cache (L1*d*) 20 with the cache-line data from the cache array (L3_cache) 52 of the third level cache (L3) 300. The response installs the cache-line in the cache array (L1*d*_cache) 22 of the first level data cache (S1*d*) 20 and updates also the directory (L2*d*_dir) 44 of the second level data cache (L2*d*) 40 and the directory (L1*d*_dir) 24 of the first level data cache (L1*d*) 10. The response arbiter 70 of the second level cache (L2) 200 has two options for collision handling. The response arbiter 70 can invalidate one response and re-request it, or write one response into a buffer and transfer it to the first level data cache (L1d) 20 later.

Alternatively in an embodiment, not shown, the request from the first level data cache (L1d, L1d') 20, 20' is sent directly to the directory (L3_dir) 54 of the third level cache (L3) 300 via the second request arbiter 80 of the third level cache (L3) 300 in step S220. Here the miss in the directory (L2i_dir) 34 is used to generate a signal to enable the response arbiter 70 of the second level cache (L2) 200 to forward the response of the third level cache (L3) 300 to the first level data cache (L1d, L1d') 20, 20' in step S240.

In case of a hit in the instruction cache directory (L2i_dir) 34 of the second level cache (L2) 200, a corresponding response to the request is based on an ownership of the request and an ownership of a requested cache-line. In case of an exclusive ownership request hitting a shared ownership cache-line step S300 goes to step S310, else step S310 goes to step S340. In step S310, the second level instruction cache (L2i) 30 sends an exclusive request via the second request arbiter 80 to the third level cache (L3) 300 to promote the cache-line from the shared ownership to an exclusive ownership. In step S320, the second request arbiter 80 of the third level cache (L3) 300 handles a coherency protocol and the competition of the request with other requests to the third level cache (L3) 300, for example, from other processors or from the first level data cache (L1d) 20 via the directory (L2d_dir) 44 of the second level data cache (L2d) 40 of this processor 3. In step S330 the third level cache (L3) 300 sends the response to the second level instruction cache (L2i) 30. The response installs the exclusive cache-line from the cache array (L3_cache) 52 of the third level cache (L3) 300 in the cache array (L2i_cache) 32 of the second level instruction cache (L2i) 30, also updating the directory (L2i_dir) 34 of the second level instruction cache (L2i) 30. In step S340, the second level instruction cache (L2i) 30 forwards the response via the response arbiter 70 of the second level cache (L2) 200 to the first level data cache (L1d) 20. The response installs the exclusive cache-line of the cache array (L2i_cache) 32 of the second level instruction cache (L2i) 30 in the cache array (L1d_cache) 22 of the first level data cache (L1d) 20 and updates also the directory (L1d_dir) 24 of the first level data cache (L1d) 20.

The cache coherency protocol (MESI) allows requests with a shared ownership or with an exclusive ownership for the first level data cache (L1d) 20 misses. The first level instruction cache (L1i) 10 does not request exclusive rights, so all requests from the first level instruction cache (L1i) 10 have a shared ownership. When a cache-line is in the shared state, it allows copies to co-exist in more than one cache of the same cache level. These caches may be in different processors, and also in the first level instruction cache (L1i) 10 and in the first level data cache (L1d) 20. An exclusive copy of a cache-line does not allow a second copy in any other cache of the same cache level (e.g.: L1).

Table 1 lists all legal combinations of the states of a cache-line, in one embodiment. In Table 1 "S" represents a shared ownership, "X" represents an exclusive ownership, and "-" represent invalid.

TABLE 1

| State | L2i | L1i | L1d |
|---|---|---|---|
| 0 | — | — | — |
| 1 | S | — | — |
| 2 | X | — | — |
| 3 | — | — | X |

TABLE 1-continued

| State | L2i | L1i | L1d |
|---|---|---|---|
| 4 | — | — | S |
| 5 | S | S | — |
| 6 | S | S | S |
| 7 | S | — | S |
| 8 | X | S | — |
| 9 | X | S | S |
| 10 | X | — | S |
| 11 | X | — | X |

In Table 1, the following exemplary state transitions may occur:

Any state to 0: Invalidate command from the third level cache (L3) or cache replacement in the second level instruction cache (L2i) and/or the first level data cache (L1d, L1d').

Transitions 2 to 1, 3 to 4, 8 to 5, 9 to 6, 10 to 7, 11 to 7: Third level cache (L3) request to demote the exclusive line to shared.

Transition 0 to 5: First level instruction cache (L1i) miss, responded with a request for shared.

Transition 0 to 4: First data cache (L1d, L1d') miss, responded with a request for shared.

Transition 0 to 3: First level data cache (L1d, L1d') miss, responded with a request for exclusive.

Transition 1 to 5: First level instruction cache (L1i) miss, responded with a request for shared.

Transition 1 to 7: First level data cache (L1d, L1d') miss, responded with a request for shared.

Transition 1 to 11: First level data cache (L1d, L1d') miss, responded with a request for exclusive.

Transition 2 to 8: First level instruction cache (L1i) miss, responded with a request for shared.

Transition 2 to 10: First level data cache (L1d, L1d) miss, responded with a request for shared.

Transition 2 to 11: First level data cache (L1d, L1d') miss, responded with a request for exclusive.

Transition 3 to 5: First level instruction cache (L1i) miss, responded with a request for shared.

Transition 4 to 3: First level data cache (L1d, L1d') request exclusive (hits shared in the first level data cache (L1d, L1d')).

Transition 4 to 5: First level instruction cache (L1i) miss, responded with a request for shared.

Transition 5 to 1: First level instruction cache (L1i) replacement.

Transition 5 to 6: First level data cache (L1d, L1d') miss, responded with a request for shared.

Transition 5 to 11: First level data cache (L1d, L1d') miss, responded with a request for exclusive.

Transition 6 to 7: First level instruction cache (L1i) replacement.

Transition 6 to 5: First level data cache (L1d, L1d') replacement.

Transition 6 to 11: First level data cache (L1d, L1d') miss, responded with a request for exclusive.

Transition 7 to 1: First level data cache (L1d, L1d') replacement.

Transition 7 to 6: First level instruction cache (L1i) miss, responded with a request for shared.

Transition 7 to 11: First level data cache (L1d, L1d') miss, responded with a request for exclusive.

Transition 8 to 2: First level instruction cache (L1i) replacement.

Transition 8 to 9: First level data cache (L1d, L1d') miss, responded with a request for shared.

Transition 8 to 11: First level data cache (L1d, L1d') miss, responded with a request for exclusive.

Transition 9 to 8: First level data cache (L1d, L1d') replacement.

Transition 9 to 10: First level instruction cache (L1i) replacement.

Transition 9 to 11: First level data cache (L1d, L1d') miss, responded with a request for exclusive.

Transition 10 to 9: First level instruction cache (L1i) miss, responded with a request for shared.

Transition 10 to 2: First level data cache (L1d, L1d') replacement.

Transition 10 to 11: First level data cache (L1d, L1d') hit shared, responded with a request for exclusive.

Transition 11 to 2: First level data cache (L1d, L1d') replacement.

Transition 11 to 9: First level instruction cache (L1i) miss, responded with a request for shared.

The directory (L2d_dir) 44 of the second level data cache (L2d) 40 is not listed in Table 1, as it only serves the purpose to find the index (the synonym based on the virtual address) into the directory (L1d_dir) 24, (L1.5d_dir) 25 of the first level data cache (L1d) 20, (L1d') 20'. It is updated when a new cache-line is installed in the first level data cache (L1d, L1d'). The directory (L1d_dir) 24 of the first level data cache (L1d) 20 or the directory (L1.5d_dir) 25 of the first level data cache (L1d') 20' is a subset of the directories (L2d_dir) 44 and (L2i) 34 of the second level cache (L2) 200. As the directory (L2d_dir) 44 of the second level data cache (L2d) 40 is limited in size, a replacement of an entry in the directory (L2d_dir) 44 of the second level data cache (L2d) 40 is to make sure the victim is no longer valid in the first level data cache (L1d) 20, (L1d') 20'. If the victim of the replacement in the directory (L2d_dir) 44 of the second level data cache (L2d) 40 is still valid in the first level data cache (L1d) 20, (L1d') 20' it is to be invalidated. This is handled as if the victim was invalidated by a cross interrogate command.

The above described state transitions have been presented for purposes of illustration only, but are not intended to be exhaustive or limiting the present invention to the state transitions disclosed.

In an embodiment of the present invention, a hierarchical cache structure comprises at least one real indexed higher level cache with directory and a unified cache array for data and instructions and at least two lower level caches, each split in an instruction cache and a data cache; wherein an instruction cache of a split real indexed second level cache comprises a directory and a corresponding cache array connected to the real indexed third level cache; wherein a data cache of the split second level cache comprises a directory connected to the third level cache; wherein an instruction cache of a split virtually indexed first level cache is connected to the second level instruction cache; wherein a cache array of a data cache of the first level cache is connected to the cache array of the second level instruction cache and to the cache array of the third level cache; and wherein a directory of the first level data cache is connected to the second level instruction cache directory and to the third level cache directory.

In further embodiments of the present invention, cache-lines owned exclusive are valid in the cache array of the second level instruction cache or in the cache array of the first level data cache or in the cache array of the second level instruction cache and in the cache array of the first level data cache.

In further embodiments of the present invention, the real indexed second level cache performs reverse translation of a real address back to a virtual address, wherein the directories of the real indexed second level cache are indexed with the real address and keep a synonym based on a corresponding virtual address for every entry sent when a cross interrogation command is forwarded to the first level data cache directory and/or to the first level instruction cache directory.

In further embodiments of the present invention, the second level data cache directory is a content addressable memory with one entry per cache-line of the cache array of the first level data cache.

In further embodiments of the present invention, the first level data cache is implemented as a multi-level structure comprising a first cache array and a corresponding first directory and a larger second cache array and a corresponding second directory.

In another embodiment of the present invention, in a method for handling a hierarchical cache structure comprising at least one real indexed higher level cache with a directory and a unified cache array for data and instructions and at least two lower level caches, each split in an instruction cache and a data cache, an instruction cache of a split real indexed second level cache initiates requests to a real indexed third level cache; wherein an instruction cache of a split virtually indexed first level cache initiates requests to the instruction cache of the split real indexed second level cache and a data cache of the split virtually indexed first level cache initiates requests to the second level instruction cache and to the third level cache.

In further embodiments of the present invention, a request comprises a command, a command validation and an address of a corresponding cache-line.

In further embodiments of the present invention, a search for a requested address is sent to a directory of a corresponding cache level, wherein in case of a miss a directory of a corresponding cache level sends the request to a directory of a higher cache level until the request is sent to a main memory, and wherein in case of a hit a cache array of a corresponding cache level sends a response to the request to a cache array of a lower cache level until the response is sent to a processor, wherein the response installs cache-line data of the cache array of the higher cache level in a corresponding cache array of the lower cache level and updates a corresponding directory of the lower cache level accordingly.

In further embodiments of the present invention, a search for a requested instruction address is sent from the processor to an instruction cache directory of the first level cache, wherein in case of a miss the instruction cache directory of the first level cache sends the request to an instruction cache directory of the second level cache, wherein in case of a hit a response to the request is sent to a cache array of the first level instruction cache with cache-line data from a cache array of the second level instruction cache, and wherein in case of a miss the instruction cache directory of the second level cache sends the request to a directory of a third level cache.

In further embodiments of the present invention, a search for a requested data address is sent from the processor to a data cache directory of the first level cache, wherein in case of a miss the data cache directory of the first level cache sends the request to the third level cache, and to the instruction cache directory of the second level cache, wherein in case of a hit in the instruction cache directory of the second level cache cache-line data of the second level instruction cache are installed in the cache array of the first level data cache, else cache-line data of the third level cache are installed in the cache array of the first level data cache.

In further embodiments of the present invention, the request of the first level data cache is sent unconditionally or via a request generator to the third level cache, wherein the instruction cache directory of the second level cache enables the request generator in case of a miss in the instruction cache directory of the second level cache to forward the request from the first level data cache to the third level cache, and blocks the request generator in case of a hit in the instruction cache directory of the second level cache.

In further embodiments of the present invention, the response of the third level cache is sent to the first level data cache via a response arbiter, wherein the instruction cache directory of the second level cache enables the response arbiter in case of a miss in the instruction cache directory of the second level cache to forward the response from the third level cache to the first level data cache, and blocks the response arbiter in case of a hit in the instruction cache directory of the second level cache.

In further embodiments of the present invention, in case of a hit in the instruction cache directory of the second level cache a corresponding response to the request is based on an ownership of the request and an ownership of a requested cache-line; wherein in case of an exclusive ownership request hitting a shared ownership cache-line an ownership promotion of the cache-line to exclusive is initiated by the second level instruction cache, else a response to the request is sent from the cache array of the second level instruction cache to the cache array of the first level data cache with cache-line data from the cache array of the second level instruction cache accordingly updating the data cache directory of the first cache level, wherein the instruction cache directory of the second level cache sends an exclusive ownership request to the directory of the third level cache to initiate the ownership promotion of the cache-line to exclusive, wherein a corresponding response to the request comprises the requested exclusive cache-line from a higher level cache, wherein the requested exclusive cache-line is installed in the cache array of the second level instruction cache and in the cache array of the first level data cache, and wherein corresponding directories of the second level instruction cache and the first level data cache are updated accordingly.

In another embodiment of the present invention, a data processing program for execution in a data processing system comprises software code portions for performing a method for handling a virtually indexed hierarchical cache structure when the program is run on the data processing system.

In yet another embodiment of the present invention, a computer program product stored on a computer-usable medium, comprises computer-readable program means for causing a computer to perform a method for handling a hierarchical cache structure when the program is run on the computer.

Embodiments of the present invention improve efficiency of the multi-level cache hierarchy handling.

In embodiments of the present invention, a hierarchical cache structure comprises at least one real indexed higher level cache comprising a unified cache array for data and instructions and at least two lower level caches each split in an instruction cache and a data cache. An instruction cache and a data cache of a split real indexed second level cache are connected to a real indexed third level cache; wherein the second level data cache is a directory-only-cache without a cache array. An instruction cache of a split virtually indexed first level cache is connected to the instruction cache of the split real indexed second level cache, and a data cache of the split virtually indexed first level cache is connected to the instruction cache of the split real indexed second level cache and to the real indexed third level cache.

Embodiments of the present invention connect a cache array of a lower level cache to a cache array of a higher level cache by skipping a cache array of a cache level in between. Embodiments of the present invention eliminate the cache array of the second level data cache to connect a cache array of a first level data cache directly with the unified cache array of the third level cache, and connect a first level data cache directory to a second level instruction cache directory and to a third level cache directory. Since the second level data cache is a directory-only-cache, the cache-array of the first level data cache is connected directly to the unified cache array of the third level cache. Because of the "hybrid" structure of the second level instruction cache, the cache array of the first level data cache is also connected to a cache array of the second level instruction cache. A cache array of the first level instruction cache is connected to the cache array of the second level instruction cache. The cache array of the second level instruction cache is connected to the unified cache array of the third level cache. For cross interrogate command handling of cache-lines not in the cache array of the second level instruction cache, embodiments of the present invention use the directory of the second level data cache. Further the cache array of the first level data cache may be built as a multi-level cache.

Embodiments of the present invention may use MESI (or similar) as a cache coherency protocol. Cache-lines owned exclusive by one cache must not be valid in any other cache of the same cache level. A cache-line in an ownership state shared may be valid in more than one cache. The third level cache (or the memory/cache hierarchy above) sends cross interrogate commands to maintain the cache consistency. Cross interrogate commands are based on real addresses. The virtually indexed first level caches either have to search all entries that possibly contain the address, or, as in embodiments of the present invention, they use the reverse translation of the real address back to the virtual address. Only the bits used as index are used from the virtual address (synonym). The directories of the second level caches are indexed with the real address. For every entry, the directory of the second level instruction cache and the directory of the second level data cache keep the synonym and send it when they forward the cross interrogate command to the directory of the first level instruction cache and/or to the directory L1$d$_dir of the first level data cache. In embodiments of the present invention, the cache array of the first level data cache is about as big as the cache array of the second level instruction cache, and as any cache array of the second level data cache could probably be built with the restrictions by chip-size etc. The directory of the first level data cache is a subset of the directory of the second level data cache and the directory of the second level instruction cache. Where the cache array of the second level instruction cache holds the data shared between the cache array of the first level instruction cache and the cache array of the first level data cache, with the shared part being rather small (e.g. 5 to 10%). The directory of the second level data cache is bigger than the directory of the first level data cache because of address aliasing. An n-way set associative virtually indexed first level data cache can hold n different entries with the same virtual index. An n-way set associative real indexed second level data cache can hold n different entries with the same real index. Whenever more than n first level data cache entries have the same real index, the directory of the second level data cache will not be able to store all of them. So cross interrogate commands are sent to the first level data cache to delete the entries that are not kept in the directory of the second level data cache. This problem does not allow for optimal use of the entire first level data cache—it performs as if the first level data cache was smaller. Performance simulations are showing that a directory of the second level data cache being 20% bigger than the directory of the first level data cache reduces the address aliasing to an insignificant value.

The above, as well as additional purposes, features, and advantages of the present invention are apparent in the detailed written description.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for handling a hierarchical cache structure, said computer program product comprising:
    a computer readable storage medium readable by a processing circuit and storing instructions for execution by the processing circuit for performing a method comprising:
        initiating requests by a real indexed cache at one level of a hierarchical cache structure to a real indexed cache at another level of the hierarchical cache structure;
        initiating requests by a virtually indexed cache to said real indexed cache at the one level; and
        initiating other requests by said virtually indexed cache to said real indexed cache at the one level and to said real indexed cache at the another level.

2. The computer program product according to claim 1, wherein the virtually indexed cache is at a different level of the hierarchical cache structure than the one level and the another level.

3. The computer program product according to claim 1, wherein the virtually indexed cache is a split virtually indexed cache, the split virtually indexed cache comprising an instruction cache and a data cache.

4. The computer program product according to claim 3, wherein the initiating requests by the virtually indexed cache to the real indexed cache at the one level comprises initiating requests by the instruction cache of the split virtually indexed cache, and wherein the initiating other requests by the virtually indexed cache to the real indexed cache at the one level and to the real indexed cache at the another level comprises initiating requests by the data cache of the split virtually indexed cache.

5. The computer program product according to claim 1, wherein the method further comprises sending a search for a requested address to a directory of a corresponding cache level, wherein based on a miss, the directory of the corresponding cache level sends said request to a directory of a higher cache level until said request is sent to a main memory, and wherein based on a hit, a cache array of the corresponding cache level sends a response to said request to a cache array of a lower cache level until said response is sent to a processor, wherein said response installs cache-line data of said cache array of said corresponding cache level in a corresponding cache array of said lower cache level and updates a corresponding directory of said lower cache level accordingly.

6. The computer program product according to claim 1, wherein the one level comprises a second level of the hierarchical cache structure, the another level comprises a third level of the hierarchical cache structure, and the virtually indexed cache is a first level cache of the hierarchical cache structure.

7. The computer program product according to claim 6, wherein the method further comprises sending a search for a requested instruction address from a processor to an instruction cache directory of said first level cache, said virtually indexed cache comprising a first level instruction cache and a first level data cache, and wherein based on a miss, said instruction cache directory of said first level cache sends said request to an instruction cache directory of said real indexed cache at said second level, and wherein based on a hit, a response to said request is sent to a cache array of said first level instruction cache with cache-line data from a cache array of said real indexed cache at said second level, and wherein based on a miss, said instruction cache directory of said real indexed cache at said second level sends said request to a directory of a third level cache.

8. The computer program product according to claim 6, wherein the method further comprises sending a search for a requested data address from a processor to a data cache directory of said first level cache, wherein based on a miss, said data cache directory of said first level cache sends said request to said real indexed cache at said third level and to an instruction cache directory of said real indexed cache at said second level, and wherein based on a hit in said instruction cache directory of said real indexed cache at said second level, cache-line data of an instruction cache of said real indexed cache at said second level is installed in a cache array of a data cache of said first level cache, else cache-line data of said real indexed cache at said third level is installed in said cache array of said data cache at said first level cache.

9. The computer program product according to claim 8, wherein said request of said data cache of said first level cache is sent unconditionally or via a request generator to said real indexed cache at said third level, and wherein said instruction cache directory of said real indexed cache at said second level enables said request generator, based on a miss in said instruction cache directory of said real indexed cache at said second level, to forward said request from said data cache of said first level cache to said real indexed cache at said third level, and blocks said request generator based on a hit in said instruction cache directory of said real indexed cache at said second level.

10. The computer program product according to claim 9, wherein the method further includes sending a response of said real indexed cache at said third level to said data cache of said first level cache via a response arbiter, wherein said instruction cache directory of said real indexed cache at said second level enables said response arbiter based on a miss in said instruction cache directory of said second level to forward said response from said real indexed cache at said third level to said data cache of said first level cache, and blocks said response arbiter based on a hit in said instruction cache directory of said real indexed cache at said second level.

11. A computer system for handling a hierarchical cache structure, said computer system comprising:
   a memory; and
   a processor in communication with the memory, wherein the computer system is configured to perform a method, said method comprising:
      initiating requests by a real indexed cache at one level of a hierarchical cache structure to a real indexed cache at another level of the hierarchical cache structure;
      initiating requests by a virtually indexed cache to said real indexed cache at the one level; and
      initiating other requests by said virtually indexed cache to said real indexed cache at the one level and to said real indexed cache at the another level.

12. The computer system according to claim 11, wherein the method further comprises sending a search for a requested address to a directory of a corresponding cache level, wherein based on a miss, the directory of the corresponding cache level sends said request to a directory of a higher cache level until said request is sent to a main memory, and wherein based on a hit, a cache array of the corresponding cache level sends a response to said request to a cache array of a lower cache level until said response is sent to a processor, wherein said response installs cache-line data of said cache array of said corresponding cache level in a corresponding cache array of said lower cache level and updates a corresponding directory of said lower cache level accordingly.

13. The computer system according to claim 11, wherein the one level comprises a second level of the hierarchical cache structure, the another level comprises a third level of the hierarchical cache structure, and the virtually indexed cache is a first level cache of the hierarchical cache structure.

14. The computer system according to claim 13, wherein the method further comprises sending a search for a requested instruction address from a processor to an instruction cache directory of said first level cache, said virtually indexed cache comprising a first level instruction cache and a first level data cache, and wherein based on a miss, said instruction cache directory of said first level cache sends said request to an instruction cache directory of said real indexed cache at said second level, and wherein based on a hit, a response to said request is sent to a cache array of said first level instruction cache with cache-line data from a cache array of said real indexed cache at said second level, and wherein based on a miss, said instruction cache directory of said real indexed cache at said second level sends said request to a directory of a third level cache.

15. The computer system according to claim 13, wherein the method further comprises sending a search for a requested data address from a processor to a data cache directory of said first level cache, wherein based on a miss, said data cache directory of said first level cache sends said request to said real indexed cache at said third level and to an instruction cache directory of said real indexed cache at said second level, and wherein based on a hit in said instruction cache directory of said real indexed cache at said second level, cache-line data of an instruction cache of said real indexed cache at said second level is installed in a cache array of a data cache of said first level cache, else cache-line data of said real indexed cache at said third level is installed in said cache array of said data cache at said first level cache.

16. A method of handling a hierarchical cache structure, said method comprising:
   initiating requests by a real indexed cache at one level of a hierarchical cache structure to a real indexed cache at another level of the hierarchical cache structure;
   initiating requests by a virtually indexed cache to said real indexed cache at the one level; and
   initiating other requests by said virtually indexed cache to said real indexed cache at the one level and to said real indexed cache at the another level.

17. The method according to claim 16, further comprising sending a search for a requested address to a directory of a corresponding cache level, wherein based on a miss, the directory of the corresponding cache level sends said request to a directory of a higher cache level until said request is sent to a main memory, and wherein based on a hit, a cache array of the corresponding cache level sends a response to said request to a cache array of a lower cache level until said response is sent to a processor, wherein said response installs cache-line data of said cache array of said corresponding cache level in a corresponding cache array of said lower cache level and updates a corresponding directory of said lower cache level accordingly.

18. The method according to claim 16, wherein the one level comprises a second level of the hierarchical cache structure, the another level comprises a third level of the hierarchical cache structure, and the virtually indexed cache is a first level cache of the hierarchical cache structure.

19. The method according to claim 18, further comprising sending a search for a requested instruction address from a processor to an instruction cache directory of said first level cache, said virtually indexed cache comprising a first level instruction cache and a first level data cache, and wherein based on a miss, said instruction cache directory of said first level cache sends said request to an instruction cache directory of said real indexed cache at said second level, and wherein based on a hit, a response to said request is sent to a cache array of said first level instruction cache with cache-line data from a cache array of said real indexed cache at said second level, and wherein based on a miss, said instruction cache directory of said real indexed cache at said second level sends said request to a directory of a third level cache.

20. The method according to claim 18, further comprising sending a search for a requested data address from a processor to a data cache directory of said first level cache, wherein based on a miss, said data cache directory of said first level cache sends said request to said real indexed cache at said third level and to an instruction cache directory of said real indexed cache at said second level, and wherein based on a hit in said instruction cache directory of said real indexed cache at said second level, cache-line data of an instruction cache of said real indexed cache at said second level is installed in a cache array of a data cache of said first level cache, else cache-line data of said real indexed cache at said third level is installed in said cache array of said data cache at said first level cache.

* * * * *